(12) United States Patent
Kao et al.

(10) Patent No.: US 11,099,460 B2
(45) Date of Patent: Aug. 24, 2021

(54) OPTICAL ELEMENT DRIVING MECHANISM

(71) Applicant: TDK TAIWAN CORP., Taoyuan (TW)

(72) Inventors: Kuo-Chun Kao, Taoyuan (TW);
Shih-Wei Hung, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 93 days.

(21) Appl. No.: 16/400,384

(22) Filed: May 1, 2019

(65) Prior Publication Data
US 2019/0369352 A1 Dec. 5, 2019

Related U.S. Application Data

(60) Provisional application No. 62/677,753, filed on May 30, 2018.

(30) Foreign Application Priority Data

Feb. 25, 2019 (CN) .......................... 201920234928.4

(51) Int. Cl.
*G03B 13/36* (2021.01)
*G02B 27/64* (2006.01)
(Continued)

(52) U.S. Cl.
CPC ............. *G03B 13/36* (2013.01); *G02B 7/005* (2013.01); *G02B 27/646* (2013.01); *G03B 5/00* (2013.01);
(Continued)

(58) Field of Classification Search
CPC .......... G02B 7/02; G02B 7/021; G02B 7/025; G02B 7/022; G02B 7/026; G02B 7/023;
(Continued)

(56) References Cited

U.S. PATENT DOCUMENTS

2012/0039589 A1*  2/2012  Ku ........................... G03B 5/00
396/55
2015/0049209 A1*  2/2015  Hwang .............. H04N 5/23287
348/208.11

(Continued)

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

An optical element driving mechanism is provided. The optical element driving mechanism includes a case, a bottom, a holder, a driving assembly, and a position sensing assembly. The bottom is connected to the case. The holder is disposed on the bottom and holds an optical element with an optical axis. The driving assembly drives the holder to move. The position sensing assembly senses the holder. The position sensing assembly includes a magnetic element, a sensor, and a magnetic-permeable element. The magnetic element is disposed on the holder. The sensor senses the magnetic element. The magnetic-permeable element is disposed adjacent to the sensor. The magnetic element and the sensor are arranged along a first direction. The sensor and the magnetic-permeable element are arranged along a second direction. The first direction is different from the second direction.

19 Claims, 11 Drawing Sheets

(51) Int. Cl.
*H02K 41/035* (2006.01)
*G03B 5/00* (2021.01)
*G02B 7/00* (2021.01)
*H04N 5/225* (2006.01)
*G03B 13/32* (2021.01)

(52) U.S. Cl.
CPC ......... *G03B 13/32* (2013.01); *H02K 41/0354* (2013.01); *H04N 5/2254* (2013.01); *G03B 2205/0007* (2013.01); *G03B 2205/0069* (2013.01)

(58) Field of Classification Search
CPC ........ G02B 7/003; G02B 7/04; G02B 13/001; G02B 7/08; G02B 23/2476; G02B 27/62; G02B 3/00; G02B 13/004; G02B 13/0045; G02B 3/0075; G02B 5/003; G02B 5/005; G02B 13/0035; G02B 13/0085; H04N 5/2254; H04N 5/2257; H04N 5/2253; H04N 5/2252; H04N 1/113; H04N 2005/2255; H04N 5/2256; H04N 5/2259; H04N 5/23293; G03B 17/12; G03B 17/14; G03B 3/10; G03B 17/02; G03B 21/142; G03B 21/145; G03B 21/28; G03B 11/045; G03B 13/36; G03B 17/08; G03B 17/17; G03B 17/55; G03B 19/023; G03B 21/005; G03B 21/10; G03B 21/2013; G03B 21/2033; G03B 21/2066; G03B 21/208; G03B 2205/00

See application file for complete search history.

(56) References Cited

U.S. PATENT DOCUMENTS

| | | | |
|---|---|---|---|
| 2016/0344919 A1* | 11/2016 | Cho | H04N 5/2254 |
| 2018/0188476 A1* | 7/2018 | Hu | H04N 5/2254 |
| 2018/0196218 A1* | 7/2018 | Kao | G02B 7/06 |
| 2018/0284387 A1* | 10/2018 | Huang | G02B 7/09 |

* cited by examiner

OPTICAL ELEMENT DRIVING MECHANISM

CROSS-REFERENCE TO RELATED APPLICATIONS

The present application claims priority of provisional U.S. Patent Application Ser. No. 62/677,753 filed on May 30, 2018 and China Patent Application No. 201920234928.4 filed on Feb. 25, 2019, the entirety of which is incorporated by reference herein.

BACKGROUND OF THE DISCLOSURE

Field of the Disclosure

The present invention relates to a driving mechanism, and more particularly to an optical element driving mechanism.

Description of the Related Art

As technology have developed, users have gained the ability to capture photographic images and record videos using an electronic device (such as a tablet computer, a smartphone, etc.) that is equipped with the functionality of shooting pictures and recording video thanks to the miniaturization of optical element driving mechanisms.

When a user uses an electronic device equipped with such an optical element driving mechanism, shock or vibration may occur, which may cause the image or video to come out blurry. Therefore, the demand for higher quality in images or videos is increasing. An optical element driving mechanism that is able to achieve displacement correction or displacement compensation is required.

A voice coil motor (VCM) is a kind of optical element driving mechanism that uses a combination of a coil, a magnet and a spring to drive an optical element to move, in order to achieve auto focus (AF) or optical image stabilization (OIS).

Nowadays, an optical element driving mechanism may further include a magnetic element and a sensor. The magnetic element is disposed on a holder, which holds an optical element. When the holder moves, change in the magnetic field is sensed by the sensor, so the exact position of the holder can be known. Additionally, auto focus and/or optical image stabilization may be achieved.

Therefore, how to design an optical element driving mechanism to improve the sensing accuracy is a topic worth exploring and a problem worth solving.

BRIEF SUMMARY OF THE DISCLOSURE

An optical element driving mechanism is provided. The optical element driving mechanism includes a case, a bottom, a holder, a driving assembly, and a position sensing assembly. The bottom is connected to the case. The holder is disposed on the bottom and holds an optical element with an optical axis. The driving assembly drives the holder to move. The position sensing assembly senses the holder. The position sensing assembly includes a magnetic element, a sensor, and a magnetic-permeable element. The magnetic element is disposed on the holder. The sensor senses the magnetic element. The magnetic-permeable element is disposed adjacent to the sensor. The magnetic element and the sensor are arranged along a first direction. The sensor and the magnetic-permeable element are arranged along a second direction. The first direction is different from the second direction.

An optical element driving mechanism is provided. The optical element driving mechanism includes a case, a bottom, a holder, a driving assembly, and a position sensing assembly. The bottom is connected to the case. The holder is disposed on the bottom and holds an optical element with an optical axis. The driving assembly drives the holder to move. The position sensing assembly senses the holder. The position sensing assembly includes a magnetic element, a sensor, and two magnetic-permeable elements. The magnetic element is disposed on the holder. The sensor senses the magnetic element. The two magnetic-permeable elements are disposed adjacent to the sensor. The magnetic element and the sensor are arranged along a first direction. The sensor and the two magnetic-permeable elements are arranged along a second direction. The first direction is different from the second direction.

An optical element driving mechanism is provided. The optical element driving mechanism includes a case, a bottom, a holder, a driving assembly, and a position sensing assembly. The bottom is made of a magnetic-permeable material and is connected to the case. The bottom includes a receiving portion. The holder is disposed on the bottom and holds an optical element with an optical axis. The driving assembly drives the holder to move. The position sensing assembly senses the holder. The position sensing assembly includes a magnetic element and a sensor. The magnetic element is disposed on the holder. The sensor senses the magnetic element. The sensor is disposed in the receiving portion of the bottom.

BRIEF DESCRIPTION OF THE DRAWINGS

Aspects of this disclosure are best understood from the following detailed description when read with the accompanying Figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature on a second feature in the description that follows may include embodiments in which the first and second features are formed in direct contact, and may also include embodiments in which additional features may be formed between the first and second features, such that the first and second features may not be in direct contact. The ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms "about" and "substantially" typically mean within the ±20% of the stated value, more typically ±10% of the stated value and even more typically ±5% of the stated value. The stated value of the present disclosure is an approximate value. When there is no specific description, the stated value includes the meaning of "about" or "substantially".

The preferred embodiments of this disclosure are described with the drawings.

Figure 1A:
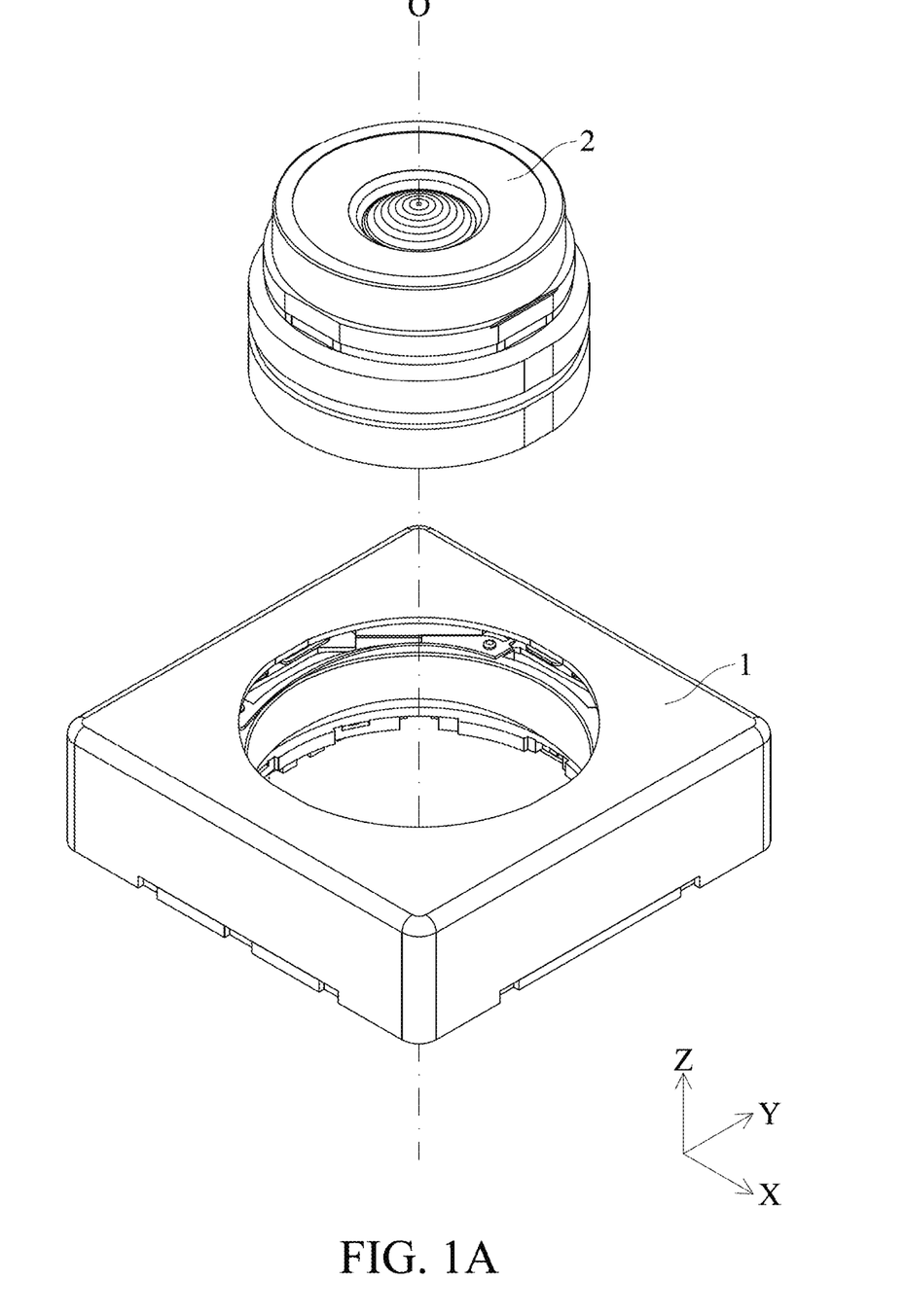
FIG. 1A is a perspective view of an optical element driving mechanism and an optical element in accordance with some embodiments of this disclosure.

FIG. 1A is a perspective view of an optical element driving mechanism 1 and an optical element 2 in accordance with some embodiments of this disclosure. The optical element driving mechanism 1 may drive the optical element 2 with an optical axis O to move. The optical element 2 may be lens. The combination of the optical element driving mechanism 1 and the optical element 2 may be applied to an electronic device for users to shoot images or videos.

Figure 1B:
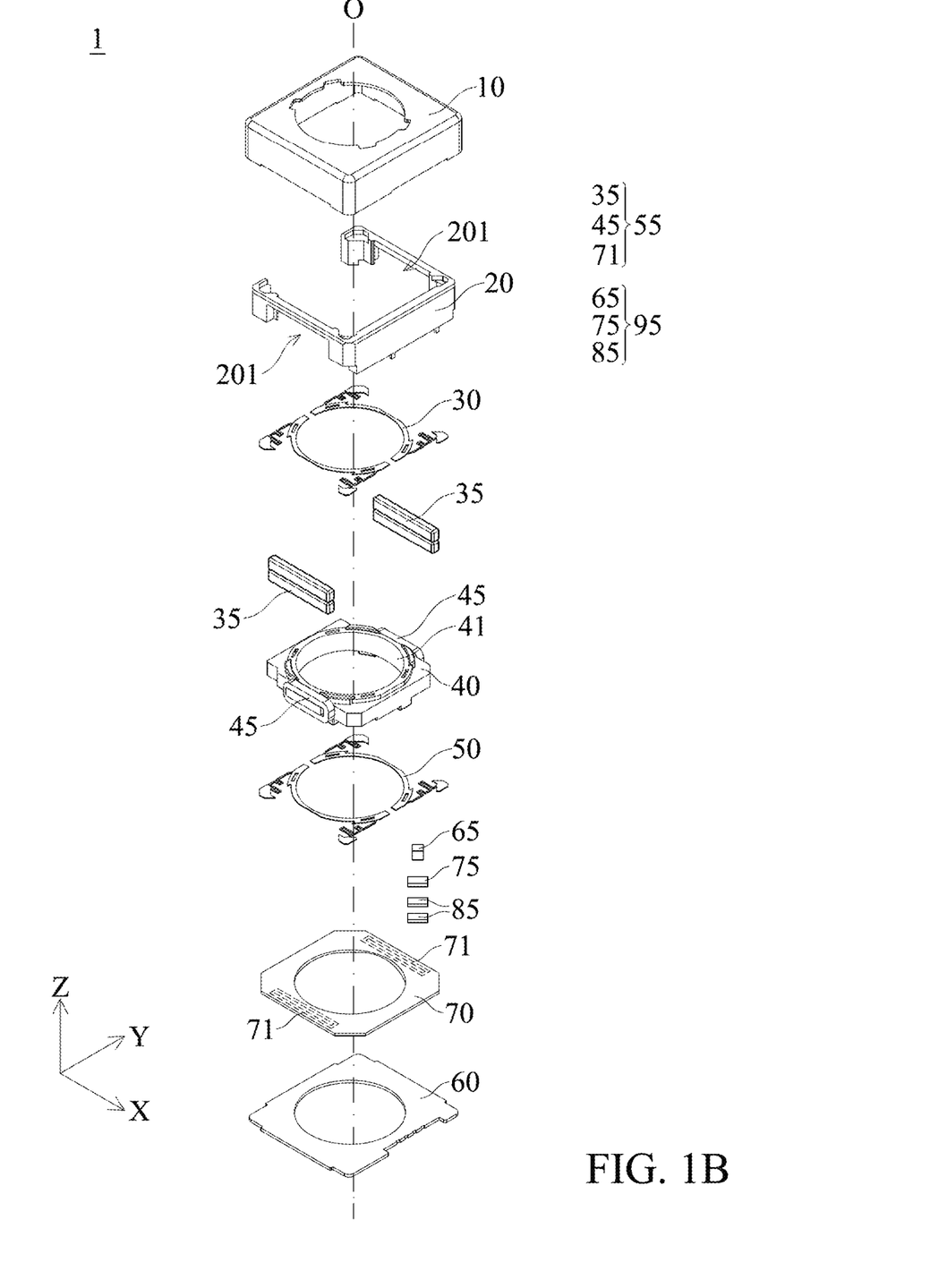
FIG. 1B is an exploded view of the optical element driving mechanism in accordance with some embodiments of this disclosure.

FIG. 1B is an exploded view of the optical element driving mechanism 1 in accordance with some embodiments of this disclosure. The optical element driving mechanism 1 includes a case 10, a frame 20, an upper spring 30, two magnets 35, a holder 40, two coils 45, a lower spring 50, a plate coil 70, a bottom 60, a magnetic element 65, a sensor 75, and two magnetic-permeable elements 85. The embodiments are for illustrated but not limited thereto. The elements of the optical element driving mechanism 1 may be added or omitted.

The case 10 is hollow and is connected to the bottom 60. The methods for connecting the case 10 and the bottom 60 may be rivet joint, engagement or welding, etc. Other elements of the optical element driving mechanism 1 may be accommodated in a space formed by the combination of the case 10 and the bottom 60.

The frame 20 is located between the case 10 and the upper spring 30. The frame 20 has two openings 201 to accommodate two magnets 35. However, the amount of the openings and the magnets are not limited. For example, there may be four openings and four magnets in other embodiments.

The upper spring 30 is located between the frame 20 and the holder 40. The holder 40 may be resiliently suspended by the upper spring 30 and the lower spring 50, so the movement range of the holder 40 is restricted.

The holder 40 is disposed on the bottom 60. The holder 40 includes a central opening 41 for holding the optical element 2 with the optical axis O. In this embodiment, two coils 45 have substantially elliptical structure and are arranged adjacent to the holder 40. The positions of the two coils 45 correspond to the positions of the two magnets 35. When a current is supplied to the two coils 45, an attractive magnetic force or a repulsive magnetic force is generated between the two coils 45 and the two magnets 35 to drive the holder 40 and the optical element 2 therein to move along a direction (Z-axis) that is parallel to the optical axis O, thereby achieving auto focus.

The plate coil 70 is located above the bottom 60, embedded with at least one coil 71. In this embodiment, there are two coils 71. The positions of the two coils 71 correspond to the positions of the two magnets 35. When a current is supplied to the two coils 71, an attractive magnetic force or a repulsive magnetic force is generated between the two coils 71 and the two magnets 35 to drive the holder 40 and the optical element 2 therein to move along a direction (X-axis or Y-axis) that is perpendicular to the optical axis O, thereby achieving optical image stabilization.

The two magnets 35, the two coils 45, and the two coils 71 may be referred to as a driving assembly 55. That is, the driving assembly 55 includes the two magnets 35, the two coils 45, and the two coils 71. The driving assembly 55 tnay drive the holder 40 to move along a direction that is parallel or perpendicular to the optical axis O. To sum up, the two magnets 35 may correspond to the two coils 35 adjacent to the holder 40 to perform auto focus and/or may correspond to the two coils 71 embedded in the plate coil 70 to perform optical image stabilization, respectively.

The magnetic element 65, the sensor 75, and the magnetic-permeable element 85 may be referred to as a position sensing assembly 95. That is, the position sensing assembly 95 includes the magnetic element 65, the sensor 75, and the magnetic-permeable element 85. The position of the holder 40 is detected or sensed by the position sensing assembly 95. The magnetic element 65 is disposed at the holder 40. The position of the magnetic element 65 is detected or sensed by the sensor 75. Additionally, the magnetic-permeable element 85 is disposed adjacent to the sensor 75. In accordance with some embodiments of the present disclosure, the distance between the sensor 75 and the magnetic-permeable element 85 is less than 4 mm. Preferably, the distance between the sensor 75 and the magnetic-permeable element 85 is less than 0.4 mm.

When the holder 40 moves, the intensity of the magnetic field from the magnetic element 65 is changed. The change of the intensity of magnetic field of the magnetic element 65 is sensed by the sensor 75. Moreover, the distribution of the magnetic lines of force of the magnetic element 65 is changed by the magnetic-permeable element 85. Therefore, the position sensing assembly 95 may detect the position of the holder 40 more accurately because of the magnetic permeable element 85. The way how the position sensing assembly 95 works is discussed in more detail in the following text.

The sensor 75 may be a hall sensor, a magnetoresistive effect sensor (MR sensor), a giant magnetoresistive effect sensor (GMR sensor), a tunneling magnetoresistive effect sensor (TMR sensor), an optical encoder or an infrared sensor. The magnetic-permeable element 85 is made of a material with magnetic permeability. Preferably, the magnetic-permeable element 85 is made of a material with high magnetic permeability, such as a ferromagnetic material, including iron/Ferrutn (Fe), Nickel (Ni), Cobalt (Co) and its alloy. Moreover, the magnetic-permeable element 85 may be cube-shaped, cylinder-shaped or cuboid-shaped.

Figure 2A:
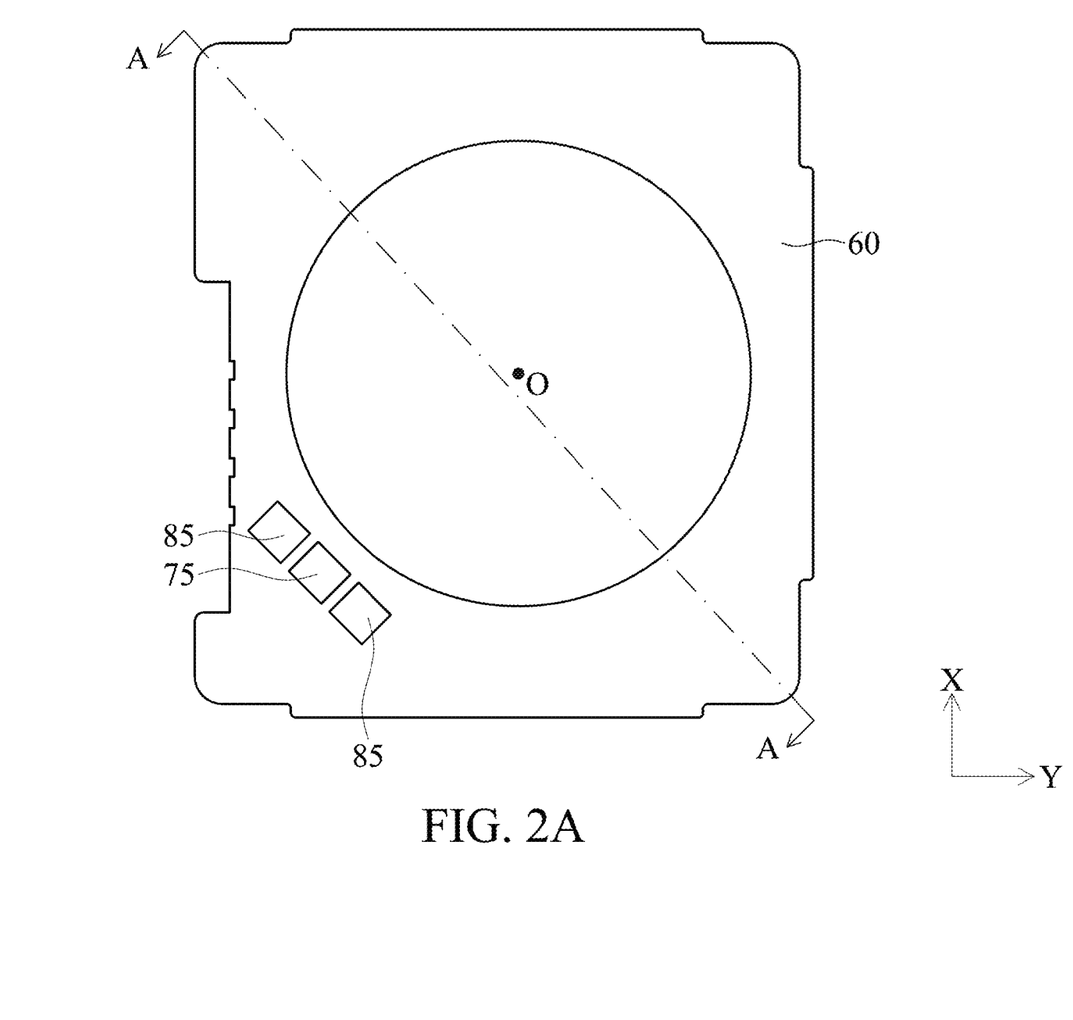
FIG. 2A is a top view of a bottom of the optical element driving mechanism in accordance with some embodiments of this disclosure.
Figure 2B:
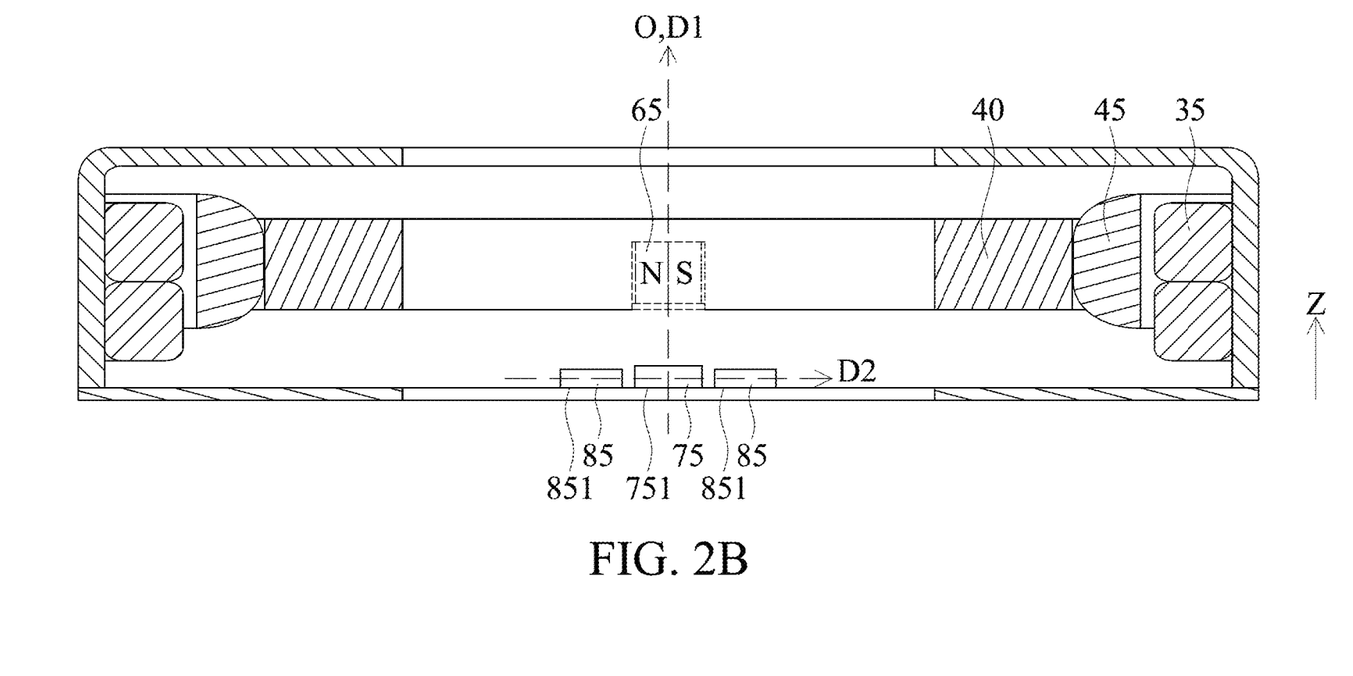
FIG. 2B is a cross-sectional view illustrated along line A-A in FIG. 2A.
Figure 2C:
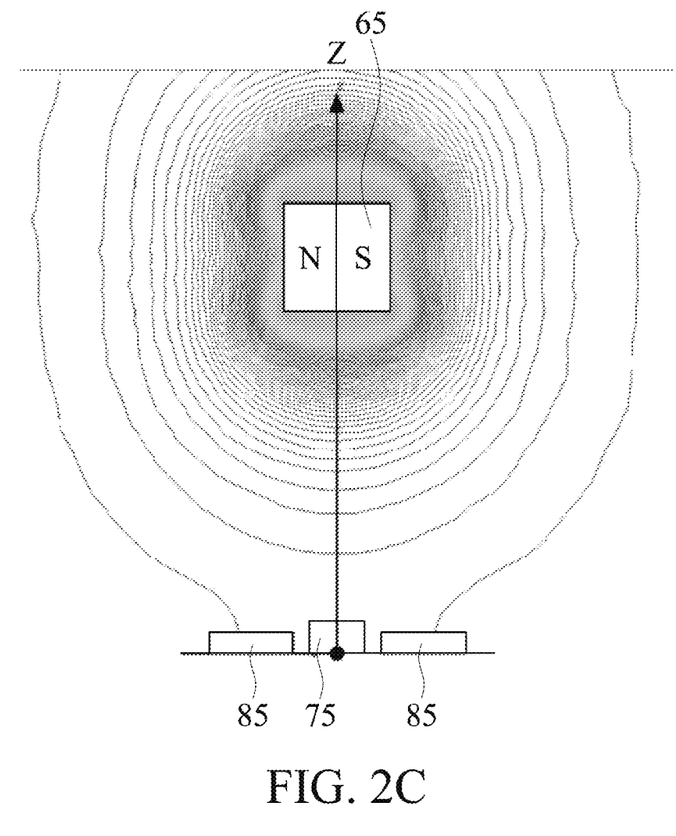
FIG. 2C is a distribution view of magnetic lines of force of a magnetic element in accordance with some embodiments of this disclosure.

Please refer to FIGS. 2A-2C to better understand how the position sensing assembly 95 functions.

FIG. 2A is a top view of the bottom 60 of the optical element driving mechanism 1 in accordance with some embodiments of this disclosure. In this embodiment, there are two magnetic-permeable elements 85. The sensor 75 and the magnetic-permeable elements 85 are disposed on the bottom 60, and the sensor 75 is disposed between the magnetic-permeable elements 85.

FIG. 2B is a cross-sectional view illustrated along line A-A in FIG. 2A. The magnetic element 65 and the sensor 75 are arranged along a first direction D1. The sensor 75 and the magnetic-permeable elements 85 are arranged along a second direction D2. The first direction D1 is different from the second direction D2. It should be noted that magnetic poles (i.e. N pole and S pole illustrated in FIG. 2B) of the magnetic element 65 are arranged along the second direction D2.

As shown in FIG. 2B, the first direction D1 along which the magnetic element 65 and the sensor 75 are arranged is parallel to the optical axis O. The second direction D2 along which the sensor 75 and the magnetic-permeable elements 85 are arranged is perpendicular to the optical axis O. Additionally, the first direction D1 is perpendicular to the second direction D2.

The sensor 75 includes a bottom surface 751 and the magnetic-permeable elements 85 include bottom surfaces 851. When viewed along the second direction D2, a portion of the sensor 75 and the magnetic-permeable elements 85 are partially overlapped with the bottom surface 751 of the sensor 75 and the bottom surfaces 851 of the magnetic-permeable elements 85 substantially aligned. In other embodiments, the sensor 75 and the magnetic-permeable elements 85 may be completely overlapped.

FIG. 2C is a distribution view of the magnetic lines of force of the magnetic element 65 in accordance with some embodiments of this disclosure. When the holder 40 moves, the intensity of magnetic field from the magnetic element 65 is changed. The change of the intensity of magnetic field of the magnetic element 65 is sensed by the sensor 75. Moreover, the distribution of the magnetic lines of force of the magnetic element 65 is changed by the magnetic-permeable elements 85. As shown in FIG. 2C, the magnetic lines of force of the magnetic element 65 are guided to the magnetic-permeable elements 85, so that the magnetic lines of force are closer to the sensor 75. Therefore, the change of the magnetic field of the magnetic element 65 may be detected more accurately by the sensor 75.

When there are no magnetic-permeable elements 85, the magnetic lines of force of the magnetic element 65 are continuous closed curves, and the curves do not intersect one another. As shown in FIG. 2C, the outermost magnetic line of force is guided to the magnetic-permeable elements 85, so that the outermost magnetic line of force is no longer a continuous closed curve. Additionally, because the magnetic-permeable elements 85 are disposed adjacent to the sensor 75, the outermost magnetic line of force is also guided to be closer to the sensor 75. Therefore, the magnetic lines of force are guided to the magnetic-permeable elements 85 no matter what the movement direction of the magnetic element 65 is. The sensing accuracy of the optical element driving mechanism 1 with the position sensing assembly 95 is improved. Furthermore, auto focus and optical image stabilization performed by the driving assembly 55 may be better achieved because the position sensing assembly 95 may protect magnetic force and may enhance magnetic force, so displacement correction and displacement compensation are improved as well.

Figure 3A:
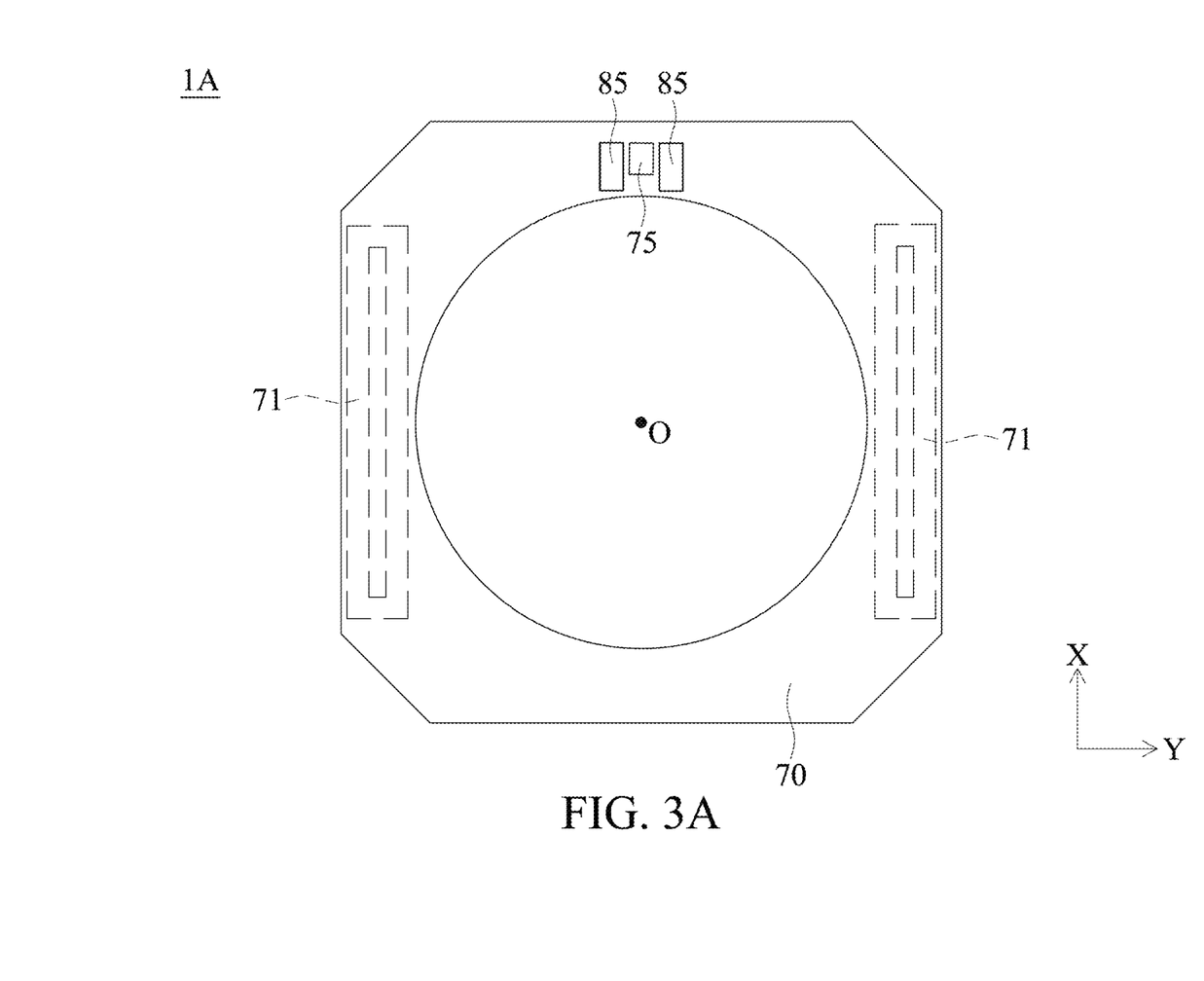
FIGS. 3A-3C are top views of a plate coil of the optical element driving mechanism in accordance with some embodiments of this disclosure.
Figure 3B:
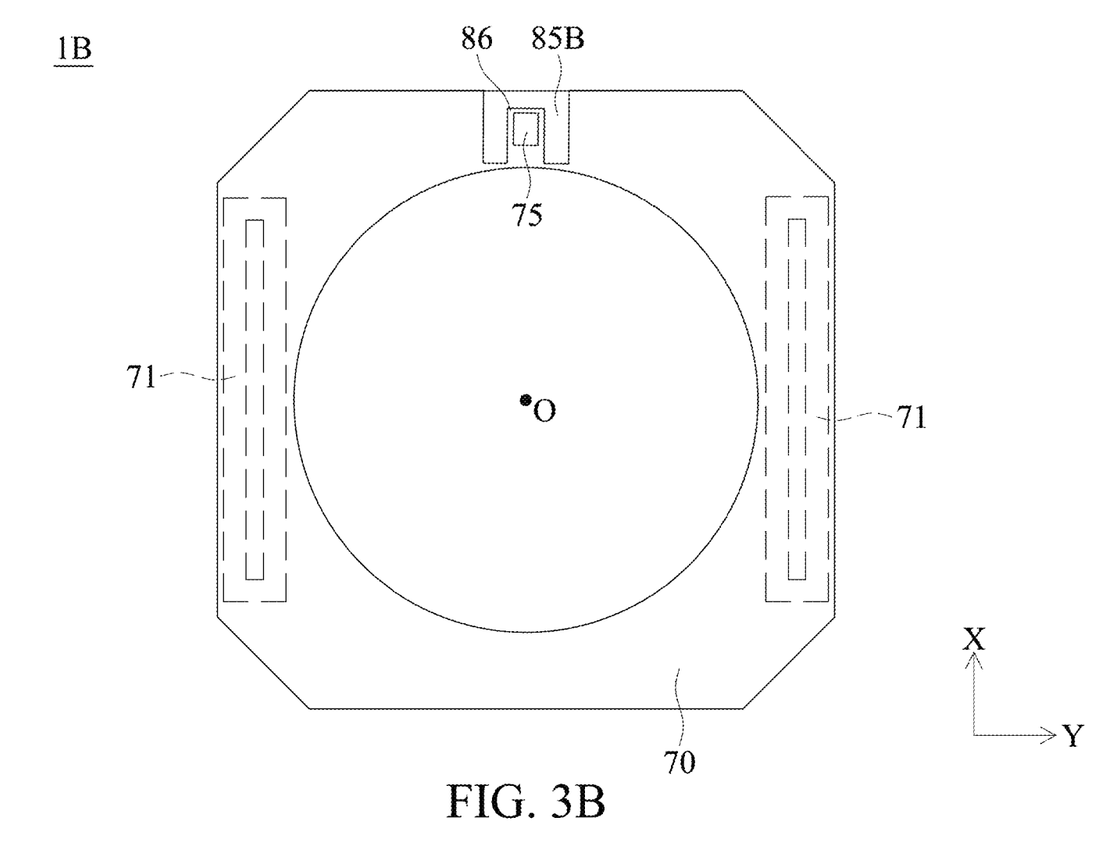
Figure 3C:
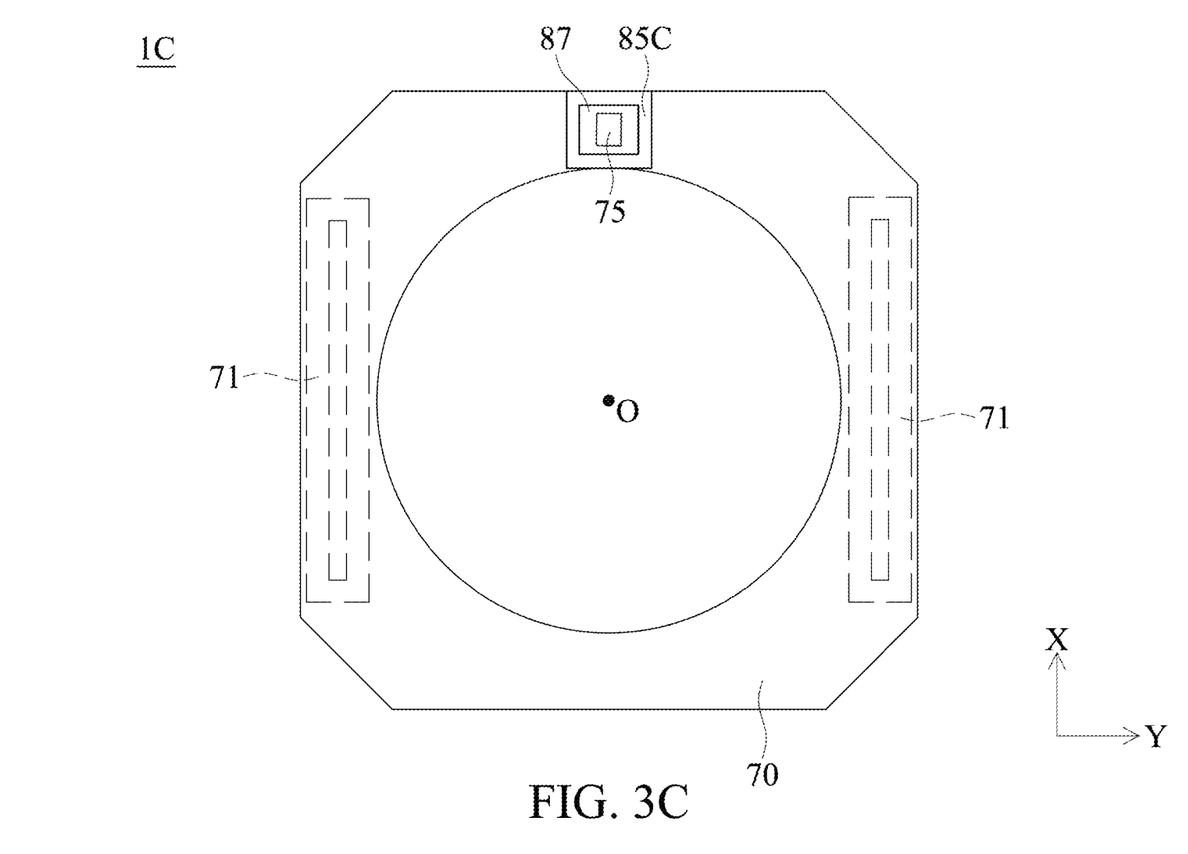

In the following text, the same elements will be denoted by the same symbols, and similar elements are denoted by similar symbols. The same content will not be described again. FIGS. 3A-3C are top views of the plate coil 70 of the optical element driving mechanism 1 in accordance with some embodiments of this disclosure. FIGS. 3A-3C illustrate different amounts and different shapes of the magnetic-permeable elements.

As shown in FIG. 3A, there are two magnetic-permeable elements 85. In this embodiment, the sensor 75 and the magnetic-permeable elements 85 are disposed on the plate coil 70. A portion of the sensor 75 is disposed between the magnetic-permeable elements 85. Moreover, the magnetic-permeable elements 85 may be cube-shaped, cylinder-shaped or cuboid-shaped.

As shown in FIG. 3B, there is one magnetic-permeable element 85B. In this embodiment, the sensor 75 and the magnetic-permeable element 85B are disposed on the plate coil 70. The magnetic-permeable element 85B is substantially U-shaped and has a receiving portion 86 to receive the sensor 75.

As shown in FIG. 3C, there is one magnetic-permeable element 85C. In this embodiment, the sensor 75 and the magnetic-permeable element 85C are disposed on the plate coil 70. The magnetic-permeable element 85C is substantially O-shaped and has a receiving portion 87 to receive the sensor 75.

Figure 4A:
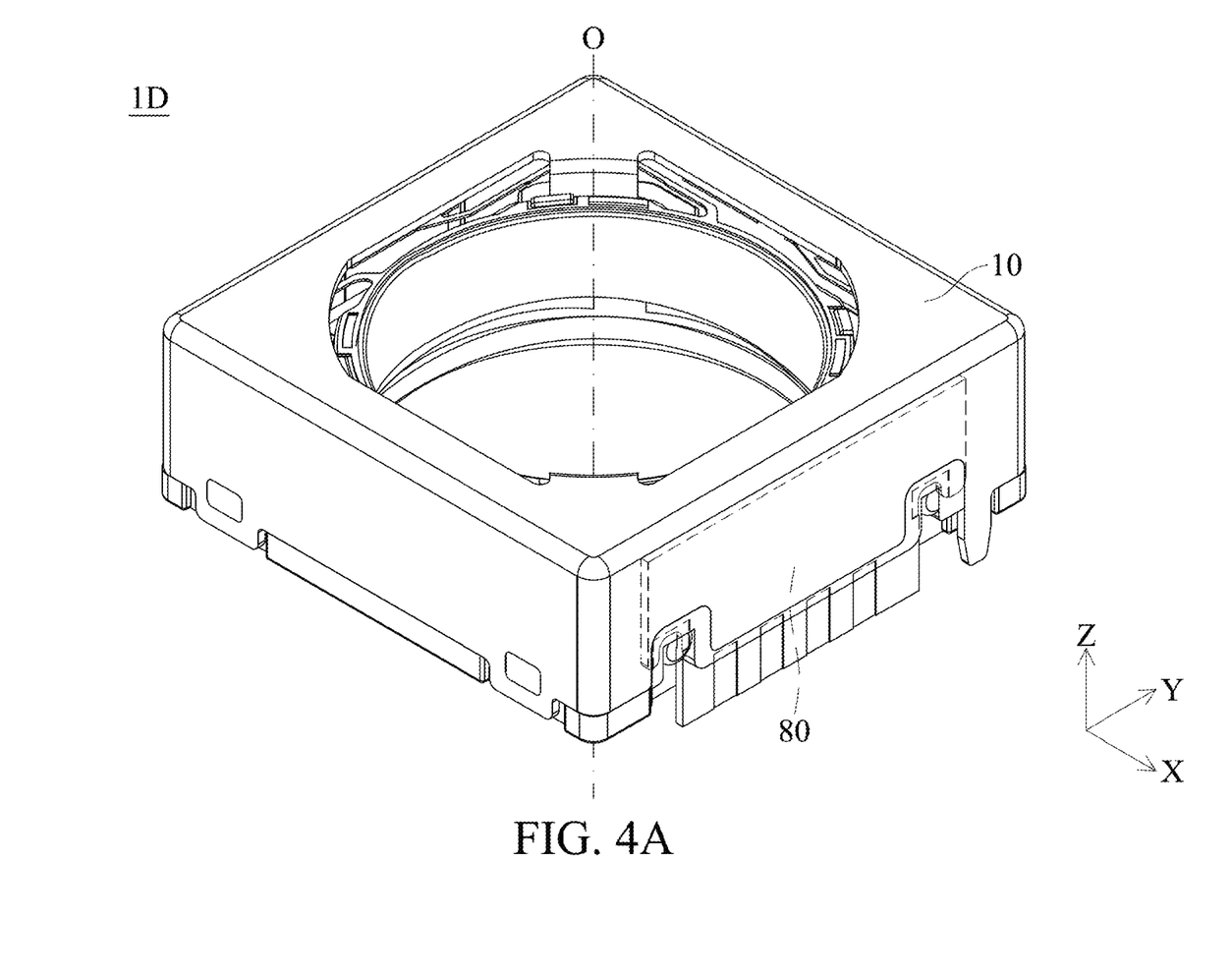
FIG. 4A is a perspective view of an optical element driving mechanism in accordance with some embodiments of this disclosure.
Figure 4B:
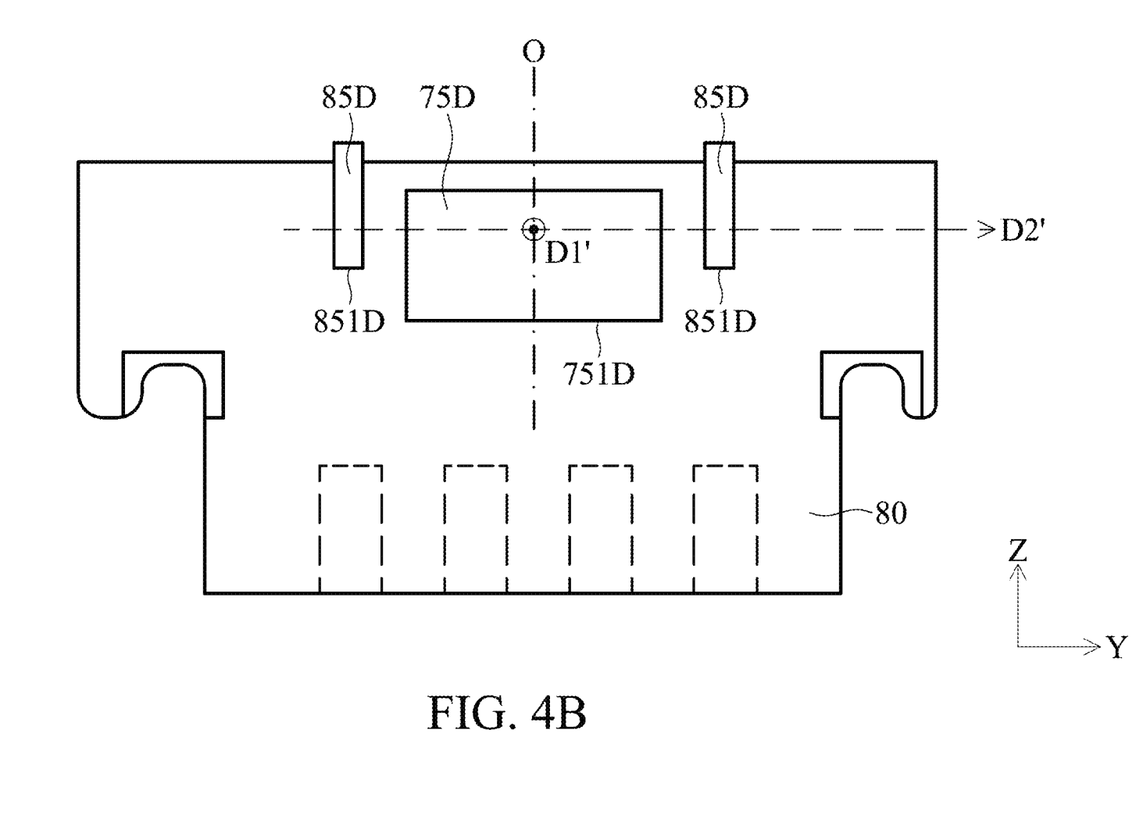
FIG. 4B is a side view of a printed circuit board of the optical element driving mechanism in accordance with some embodiments of this disclosure.

Next, please refer to FIG. 4A and FIG. 4B. FIG. 4A is a perspective view of the optical element driving mechanism 1D in accordance with some embodiments of this disclosure. In this embodiment, the optical element driving mechanism 1D further includes a printed circuit board (PCB) 80 disposed at a side of the optical element driving mechanism 1D. The printed circuit board 80 may be a flexible printed circuit board (FPC) or a rigid-flexible board. In other embodiments of the present disclosure, the printed circuit board 80 is disposed on the bottom 60 and is electrically connected to the plate coil 70.

FIG. 4B is a side view of the printed circuit board 80 of the optical element driving mechanism 1D in accordance with some embodiments of this disclosure. In this embodiment, there are two magnetic-permeable elements 85D. A sensor 75D and the magnetic-permeable elements 85D are disposed at the printed circuit board 80. A portion of the sensor 75D is disposed between the magnetic-permeable elements 85D. It should be noted that the printed circuit board 80 is disposed at a side of the optical element driving mechanism 1D in this embodiment. Even the magnetic element 65 is not shown in FIG. 4B, a first direction D1' along which the magnetic element 65 and the sensor 75D are arranged is perpendicular to the optical axis O may be known from the aforementioned configuration. A second direction D2' along which the sensor 75D and the magnetic-permeable elements 85D are arranged is also perpendicular to the optical axis O. Additionally, the first direction D1' is perpendicular to the second direction D2'.

The sensor 75D includes a bottom surface 751D and the magnetic-permeable elements 85D include bottom surfaces 851D. When viewed along the second direction D2', a portion of the sensor 75D and the magnetic-permeable elements 85D are partially overlapped. The bottom surface 751D of the sensor 75D is lower than the bottom surfaces 851D of the magnetic-permeable elements 85D.

It should be noted that shapes and arrangement of the sensors and the magnetic-permeable elements are not limited. As a comparison, please refer back to FIG. 2B and FIG. 4B. The bottom surface 751 of the sensor 75 and the bottom surfaces 851 of the magnetic-permeable elements 85 are substantially aligned in FIG. 2B while the bottom surface 751D of the sensor 75D and the bottom surfaces 851D of the magnetic-permeable elements 85D are not aligned in FIG. 4B. In other embodiments, the bottom surface 751/751D of the sensor 75/75D may be higher or lower than the bottom surface 851/851D of the magnetic-permeable elements 85/85D. It is within the scope of the present disclosure for the magnetic-permeable elements to be disposed adjacent to the sensor and for the magnetic lines of force of the magnetic element to be guided to the sensor.

In another embodiment of the present disclosure, the plate coil 70 and the printed circuit board 80 may be integrally formed as a substrate. For example, the substrate may be made of metal, and circuits may be formed on the substrate. The sensor 75 and the magnetic-permeable elements 85 may be disposed on the substrate.

Figure 5:
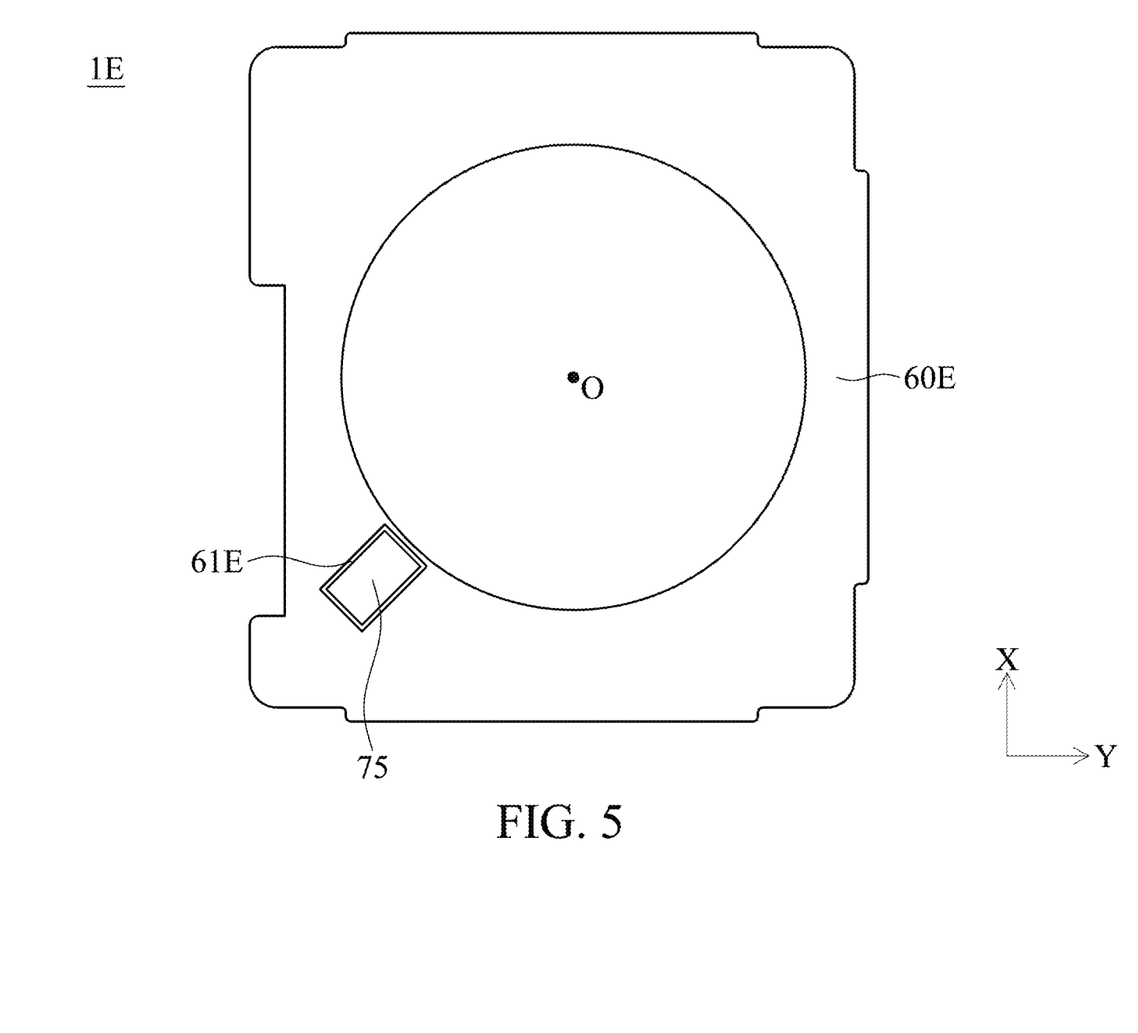
FIG. 5 is a top view of a bottom of the optical element driving mechanism in accordance with some embodiments of this disclosure.

FIG. 5 is a top view of a bottom 60E of the optical element driving mechanism 1E in accordance with some embodiments of this disclosure. In this embodiment, the bottom 60E is made of a material with magnetic permeability. The bottom 60E includes a receiving portion 61E to receive the sensor 75. The bottom 60E made of a material with magnetic permeability may achieve effects similar to the aforementioned magnetic-permeable elements 85. The distribution of the magnetic lines of force of the magnetic element 65 is changed by the bottom 60E. The magnetic lines of force of the magnetic element 65 are guided to be closer to the sensor 75. Therefore, the change of magnetic field of the magnetic element 65 may be detected more accurately by the sensor 75.

Based on the present disclosure, the distribution of the magnetic lines of force of the magnetic element may be changed by the magnetic-permeable elements or the bottom made of a material with magnetic permeability. Additionally, the change of magnetic field of the magnetic element may be detected more accurately by the sensor, so that the position of the holder may be known more accurately as well. Therefore, the sensing accuracy is improved.

Moreover, auto focus and optical image stabilization may be better achieved and displacement correction may be improved because the magnetic-permeable elements or the bottom made of a material with magnetic permeability may protect magnetic force and may enhance magnetic force.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure.

In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
a case;
a bottom, connected to the case;
a holder, disposed on the bottom, holding an optical element with an optical axis;
a driving assembly, driving the holder to move;
a position sensing assembly, sensing the holder, comprising:
a magnetic element disposed on the holder, wherein the magnetic element generates a persistent magnetic field;
a sensor sensing a movement of the holder relative to the bottom by sensing the persistent magnetic field generated by the magnetic element; and
a magnetic-permeable element disposed adjacent to the sensor, wherein the magnetic-permeable element changes a distribution of the persistent magnetic field generated by the magnetic element and does not generate a magnetic field;
wherein the magnetic element and the sensor are arranged along a first direction,
wherein when viewed from any direction that is perpendicular to the first direction, the magnetic-permeable element does not overlap the magnetic element,
wherein when viewed from a second direction that is perpendicular to the first direction, the magnetic-permeable element at least partially overlaps the sensor.

2. The optical element driving mechanism as claimed in claim 1, wherein a distance between the sensor and the magnetic-permeable element is less than 4 mm.

3. The optical element driving mechanism as claimed in claim 1, wherein a distance between the sensor and the magnetic-permeable element is about 0.4 mm.

4. The optical element driving mechanism as claimed in claim 1, wherein the first direction is perpendicular to the second direction.

5. The optical element driving mechanism as claimed in claim 1, wherein the driving assembly further comprises a coil and a magnet, and a position of the coil corresponds to a position of the magnet, wherein the driving assembly drives the holder to move along a direction that is parallel or perpendicular to the optical axis.

6. The optical element driving mechanism as claimed in claim 1, wherein magnetic poles of the magnetic element are arranged along the second direction.

7. The optical element driving mechanism as claimed in claim 1, further comprising a plurality of magnetic-permeable elements, and a portion of the sensor is located between the magnetic-permeable elements.

8. The optical element driving mechanism as claimed in claim 1, wherein the magnetic-permeable element is cube-shaped, cylinder-shaped or cuboid-shaped.

9. The optical element driving mechanism as claimed in claim 1, wherein the sensor and the magnetic-permeable element are disposed at the bottom.

10. The optical element driving mechanism as claimed in claim 1, further comprising a circuit board electrically connected to the bottom, wherein the sensor and the magnetic-permeable element are disposed at the circuit board.

11. The optical element driving mechanism as claimed in claim 1, wherein the magnetic-permeable element is substantially U-shaped and has a receiving portion to receive a portion of the sensor.

12. The optical element driving mechanism as claimed in claim 1, wherein the magnetic-permeable element is substantially O-shaped and has a receiving portion to receive a portion of the sensor.

13. The optical element driving mechanism as claimed in claim 1, wherein when viewed along the second direction, the sensor and the magnetic-permeable element are completely overlapped.

14. The optical element driving mechanism as claimed in claim 1, wherein when viewed along the second direction, the sensor and the magnetic-permeable element are partially overlapped.

15. An optical element driving mechanism, comprising:
a case;
a bottom, connected to the case;
a holder, disposed on the bottom, holding an optical element with an optical axis;
a driving assembly, driving the holder to move;
a position sensing assembly, sensing the holder, comprising:
   a magnetic element disposed on the holder, wherein the magnetic element generates a persistent magnetic field;
   a sensor sensing a movement of the holder relative to the bottom by sensing the persistent magnetic field generated by the magnetic element; and
   two magnetic-permeable elements disposed close to the sensor, wherein each of the two magnetic-permeable elements changes a distribution of the persistent magnetic field generated by the magnetic element and does not generate a magnetic field;
wherein the magnetic element and the sensor are arranged along a first direction, the sensor and the two magnetic-permeable elements are arranged along a second direction, and the first direction is perpendicular to the second direction,
wherein when viewed from any direction that is perpendicular to the first direction, the magnetic-permeable elements do not overlap the magnetic element,
wherein when viewed from the second direction, the magnetic-permeable elements at least partially overlap the sensor.

16. The optical element driving mechanism as claimed in claim 15, wherein a distance between the sensor and one of the two magnetic-permeable elements is about 0.4 mm.

17. The optical element driving mechanism as claimed in claim 15, wherein the first direction is perpendicular to the second direction.

18. The optical element driving mechanism as claimed in claim 15, wherein the driving assembly further comprises a coil and a magnet, and a position of the coil corresponds to a position of the magnet, wherein the driving assembly drives the holder to move along a direction that is parallel or perpendicular to the optical axis.

19. The optical element driving mechanism as claimed in claim 15, wherein magnetic poles of the magnetic element are arranged along the second direction.

* * * * *